United States Patent
Tsuboi

(10) Patent No.: US 7,761,747 B2
(45) Date of Patent: Jul. 20, 2010

(54) INTERRUPT CONTROL CIRCUIT

(75) Inventor: Nobuhiro Tsuboi, Osaka (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 11/797,952

(22) Filed: May 9, 2007

(65) Prior Publication Data
US 2008/0022027 A1    Jan. 24, 2008

(30) Foreign Application Priority Data
Jul. 19, 2006   (JP)   ............................. 2006-196613

(51) Int. Cl.
G06F 11/00 (2006.01)
(52) U.S. Cl. .............................. 714/51; 714/34; 714/55
(58) Field of Classification Search .................. 714/51, 714/55, 34
See application file for complete search history.

(56) References Cited
U.S. PATENT DOCUMENTS 5,423,049 A    6/1995  Kurihara
5,542,076 A *  7/1996  Benson et al. ............... 710/260
5,797,037 A    8/1998  Ecclesine
6,115,779 A    9/2000  Haubursin et al.
6,505,298 B1 * 1/2003  Cerbini et al. .................. 713/1
2007/0006030 A1* 1/2007  Wagner ........................ 714/25
2009/0187792 A1* 7/2009  Wagner ........................ 714/39

FOREIGN PATENT DOCUMENTS
JP    2002-41301    2/2002

OTHER PUBLICATIONS

Maquelin et al., "Polling Watchdog: Combining Polling and Interrupts for Efficient Message Handling", 1996, Association for Computing Machinery, Inc., pp. 178-188.*
Japan Embedded Technology Systems Association and Embedded Engineers Encouraging Committee (authors and editors), Embedded Technology for Development of Embedded System, pp. 94-97 (Nov. 15, 2003), with Partial English translation thereof.

* cited by examiner

Primary Examiner—Emerson C Puente
(74) Attorney, Agent, or Firm—McDermott Will & Emery LLP

(57) ABSTRACT

An interrupt control circuit has a condition storage circuit for storing and outputting a reference time and an error detection circuit for outputting a signal indicating error detection when an interrupt request is not generated within a period from a predetermined time till the reference time elapses.

1 Claim, 3 Drawing Sheets

INTERRUPT CONTROL CIRCUIT

CROSS REFERENCE TO RELATED APPLICATIONS

The teachings of Japanese Patent Application JP 2006-196613, filed Jul. 19, 2006, are entirely incorporated herein by reference, inclusive of the claims, specification, and drawings.

BACKGROUND OF THE INVENTION

The present invention relates to an interrupt control circuit and, more particularly, to a circuit for detecting the abnormal state of a circuit for generating an interrupt.

There has been known an information processing apparatus comprising a CPU (central processing unit) and having an interrupt control circuit for suspending a process being executed and causing an interrupt processing program (interrupt handler) having a higher priority to be executed. U.S. Pat. No. 5,423,049 discloses one example of a circuit that controls, with the use of a timer, interrupt requests to the CPU which request such interrupt processing.

There has also been a system program in which an interrupt generation circuit periodically generates an interrupt request and a CPU performs a process in response to the interrupt, thereby allowing a normal system operation to be continued. When the periodic interrupt requests are no more generated from the interrupt generation circuit, the normal system operation cannot be continued any more so that the CPU is required to detect the abnormal state and perform error handling.

For this purpose, an interrupt control circuit has used a timer interrupt as means for detecting that the interrupt requests are no more generated from the interrupt generation circuit. That is, timer interrupts are generated at a time interval at which interrupt requests are supposed to be generated and it is checked in a timer interrupt handler whether or not the interrupt requests are generated from the interrupt generation circuit. When the interrupt requests are not generated from the interrupt generation circuit, the abnormal state of the system is detected so that error handling is performed.

However, such a method has had a problem that timer interrupts need to be repeatedly performed for error detection and, accordingly, resources cannot be used efficiently. In addition, the method also has had the problem that, even when the state of the system is normal, the processing ability of the system program deteriorates since it is necessary to perform the process of the timer interrupt.

SUMMARY OF THE INVENTION

It is therefore an object of the present invention to provide an interrupt control circuit which promptly detects that interrupt requests are not periodically generated without using a timer interrupt.

Specifically, an interrupt control circuit according to the present invention comprises: a condition storage circuit for storing and outputting a reference time; and an error detection circuit for outputting a signal indicating error detection when an interrupt request is not generated within a period from a predetermined time till the reference time elapses.

In the arrangement, when the interrupt request is not generated within a predetermined time, the state as such is detected as an error. As a result, it is possible to promptly detect that the interrupt requests, which should be generated at regular time intervals, are not generated at the time intervals.

Preferably, the condition storage circuit receives the reference time from a CPU.

In the arrangement, the CPU sets the time used as a reference. Accordingly, even when the time interval at which the interrupt requests are generated dynamically changes, the CPU is allowed to preliminarily set a predetermined time interval as the reference time and detect, at the time at which the interrupt requests are no more generated at the time interval, the state as such as an error.

Preferably, the error detection circuit outputs the signal indicating error detection when a predetermined number of interrupt requests are not generated within the period.

In the arrangement, when the predetermined number of interrupt requests are not generated within the predetermined time, the state as such is detected as an error. As a result, when it has been already known that the predetermined number of interrupt requests are generated within the predetermined time, though not at regular time intervals, it can be detected that the predetermined number of interrupt requests have not been generated within the predetermined time.

Preferably, the interrupt control circuit mentioned above further comprises: an interrupt generation interval measurement circuit for measuring and outputting time intervals at which the interrupt requests are generated, wherein the condition storage circuit selects one of the time intervals measured by the interrupt generation interval measurement circuit as the reference time and the error detection circuit outputs the signal indicating error detection when an interval newly measured by the interrupt generation interval measurement circuit is larger than the reference time.

In the arrangement, when the time intervals at which the interrupt requests are generated are measured and the interrupt request is not generated within the time shown by one of the measured time intervals, the state as such is detected as an error. As a result, even though the time intervals at which the interrupt requests are generated have not been preliminarily known, when the interrupts requests are no more generated at regular time intervals afterwards, the state as such can be detected by recognizing and storing the time intervals at which the interrupt requests are generated.

Preferably, the condition storage circuit selects a maximum one of the time intervals measured by the interrupt generation interval measurement circuit as the reference time.

In the arrangement, when the measurement of the time interval at which the interrupts requests are generated is performed a plurality of times and the interrupt request is not generated within the time shown by the maximum value of the measured time intervals, the state as such is detected as an error. As a result, even when the time intervals at which the interrupt requests are generated are not regular and fluctuate, the state in which the interrupt requests are not normally generated can be detected.

Preferably, the error detection circuit outputs the signal indicating error detection only when any of the time intervals measured by the interrupt generation interval measurement circuit is larger than a value obtained by increasing the reference time at a predetermined ratio.

In the arrangement, even when the time intervals at which the interrupt requests are generated have errors between themselves and the measured time intervals, it is possible to prevent the state as such from being detected as an error provided that the errors are within a tolerable range.

Preferably, the interrupt control circuit mentioned above further comprises: an interrupt generation interval history storage circuit for storing a history of the time intervals measured by the interrupt generation interval measurement circuit, obtaining a minimum value, a maximum value, or an average value in the history, and outputting the determined value in response to a request.

The arrangement allows the transition of the time intervals of generation of the interrupt requests to be recognized and used as information for examining the specifications of a system program, an interrupt processing program, and the like.

In accordance with the present invention, it is possible to detect that the interrupt requests are not periodically generated without using a timer interrupt and the CPU or the like can perform error handling in response to the state as such.

DETAILED DESCRIPTION OF THE INVENTION

Figure 1:
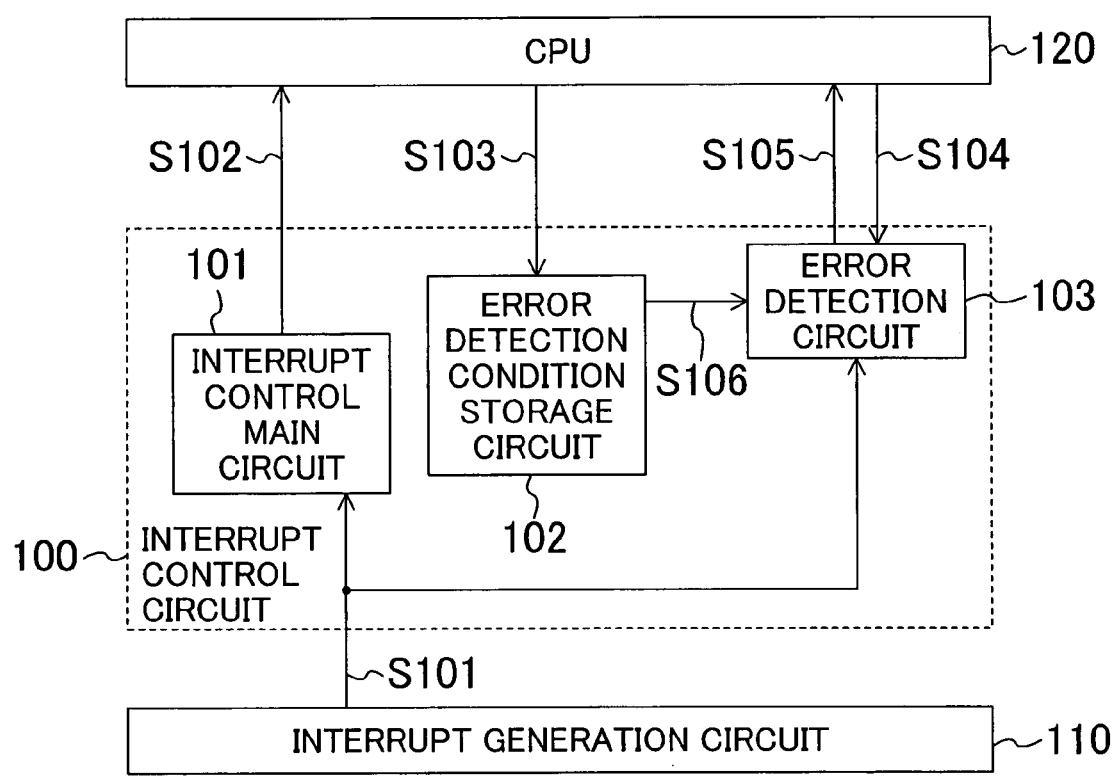
FIG. 1 is a block diagram showing a structure of an interrupt control circuit according to a first embodiment of the present invention.

Referring to the drawings, the embodiments of the present invention will be described herein below.

Embodiment 1

FIG. 1 is a block diagram showing a structure of an interrupt control circuit 100 according to the first embodiment of the present invention. The interrupt control circuit 100 of FIG. 1 comprises an interrupt control main circuit 101, an error detection condition storage circuit 102 as a condition storage circuit, and an error detection circuit 103.

An interrupt generation circuit 110 outputs an interrupt request signal S101 indicating a request for an interrupt process with respect to a CPU 120 to each of the interrupt control main circuit 101 and the error detection circuit 103.

The interrupt control main circuit 101 receives the interrupt request signal S101 from the interrupt generation circuit 110 and outputs an interrupt generation notification signal S102 notifying that an interrupt is generated to the CPU 120 when a specified condition is satisfied.

The CPU 120 outputs an error detection threshold time S103 indicating a threshold for making an error determination on the time intervals at which the interrupts are generated as well as an error detection start signal S104 indicating the start of error detection to the interrupt control circuit 100.

The error detection condition storage circuit 102 stores the time indicated by the error detection threshold time S103 received from the CPU 120 as a reference time and outputs it as error detection threshold time information S106 to the error detection circuit 103.

When the error detection circuit 103 does not receive the interrupt request signal S101 from the interrupt generation circuit 110 within a period after receiving the error detection start signal S104 from the CPU 120 till the time shown by the error detection threshold time information S106 elapses, the error detection circuit 103 outputs an error detection interrupt signal S105 notifying that an error is detected to the CPU 120.

On receiving the error detection interrupt signal S105, the CPU 120 performs error handling.

Alternatively, the error detection condition storage circuit 102 and the error detection circuit 103 may also be constructed to determine the state in which a predetermined number of the interrupt request signals S101 are generated within the period after receiving the error detection start signal S104 till the time indicated by the error detection threshold time S103 elapses as a normal state and output the error detection interrupt signal S105 to the CPU 120 when the predetermined number of the interrupt request signals S101 are not generated within the period.

Additionally, the interrupt control circuit 100 of FIG. 1 may also comprise a plurality of CPUs and the interrupt generation circuit 110 may also be composed of another CPU other than the CPU 120.

By thus using the interrupt control circuit 100 according to the present embodiment, the CPU 120 is allowed to promptly detect that the interrupt requests, which should be generated at regular time intervals from the interrupt generation circuit 110, are not generated and perform proper error handling.

In particular, since the CPU 120 can set the error detection threshold time S103, even when the time interval at which the interrupts are generated from the interrupt generation circuit 110 changes midway during the execution of a program, the interrupt control circuit 100 makes an error determination at the time at which the interrupt request signals S101 are no more generated at the regular time interval from the interrupt generation circuit 110 and the CPU 120 can perform proper error handling.

Embodiment 2

Figure 2:
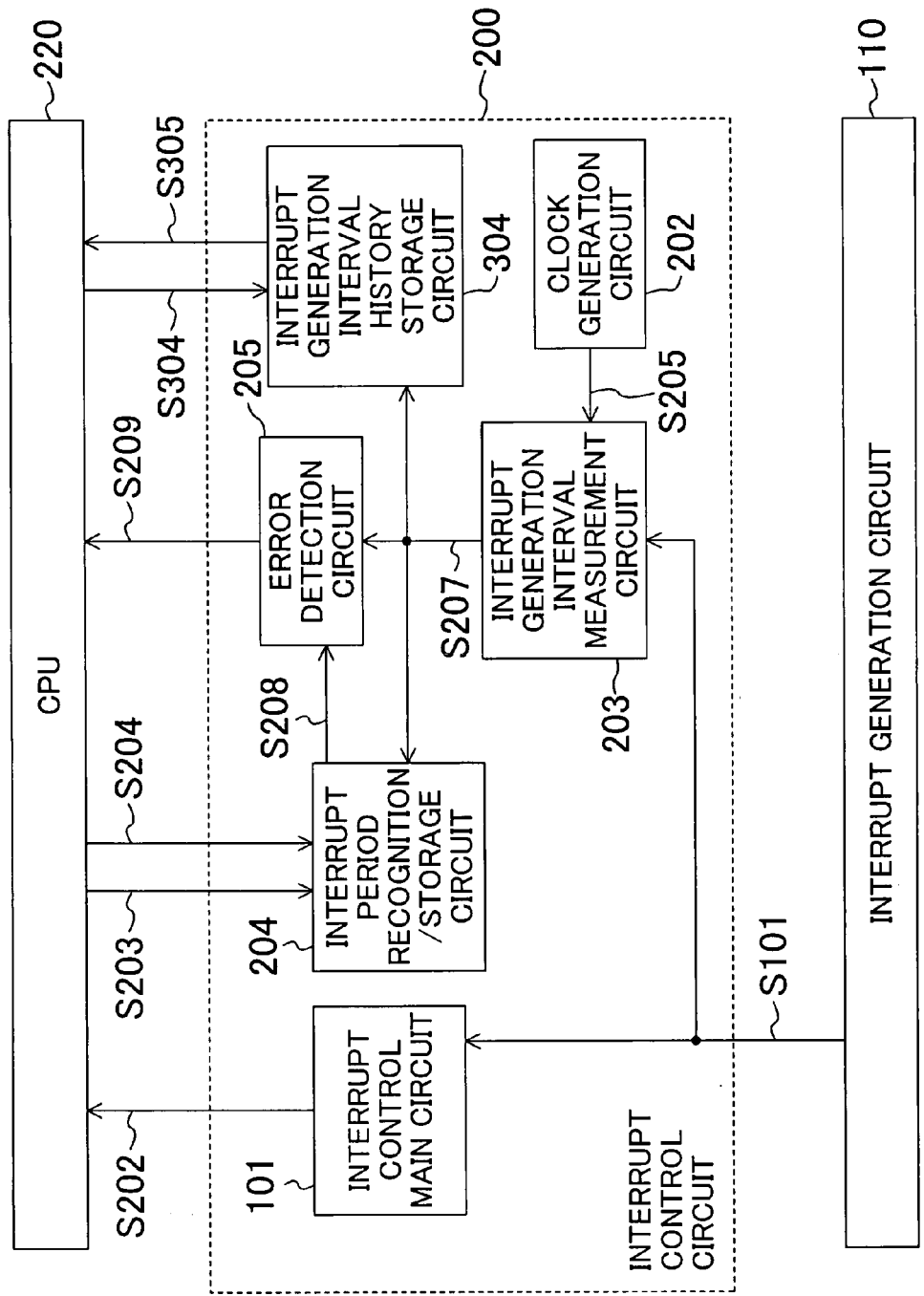
FIG. 2 is a block diagram showing a structure of an interrupt control circuit according to a second embodiment of the present invention.

FIG. 2 is a block diagram showing a structure of an interrupt control circuit 200 according to the second embodiment of the present invention. The interrupt control circuit 200 of FIG. 2 is the same as the interrupt control circuit 100 of FIG. 1, except for including an interrupt period recognition/storage circuit 204 as the condition storage circuit and an error detection circuit 205 in place of the error detection condition storage circuit 102 and error detection circuit 103 and further includes a clock generation circuit 202, an interrupt generation interval measurement circuit,203, and an interrupt generation interval history storage circuit 304.

The clock generation circuit 202 generates a clock which is sufficiently higher in frequency than the interrupt request signal S101 and outputs the generated clock as a clock S205 to the interrupt generation interval measurement circuit 203.

The interrupt generation interval measurement circuit 203 receives the interrupt request signal S101 from the interrupt generation circuit 110. Upon each generation of the interrupt request signal S101, the interrupt generation interval measurement circuit 203 measures the number of periods of the clock S205 to which the generation time interval is equivalent and outputs the obtained time interval as interrupt generation interval information S207.

A CPU 220 outputs an interrupt period recognition start signal S203 directing that the storage of the interrupt generation interval be started and an interrupt period recognition number-of-times signal S204 indicating the number of times the interrupt generation time interval is to be stored to the interrupt period recognition/storage circuit 204.

After receiving the interrupt period recognition start signal S203 from the CPU 220, the interrupt period recognition/storage circuit 204 receives values shown by the interrupt generation interval information S207 equivalent to the number of times shown by the interrupt period recognition number-of-times signal S204, selectively stores one of the values, e.g., the maximum value as a reference time, and outputs the stored value as specified interrupt generation interval information S208 to the error detection circuit 205.

When the error detection circuit 205 receives the specified interrupt generation interval information S208 from the interrupt period recognition/storage circuit 204 and subsequently receives the interrupt generation interval information S207 indicating a value larger than the value shown by the specified interrupt generation interval information S208, the error detection circuit 205 outputs an error detection interrupt signal S209 notifying that an error is detected to the CPU 220.

Alternatively, the error detection circuit 205 may also be constructed to output the error detection interrupt signal S209 only when it receives the interrupt generation interval information S207 showing a value larger than a value obtained by increasing the value shown by the specified interrupt generation interval information S208 at a predetermined ratio.

The CPU 220 outputs a history information output request S304 requesting the notification of the minimum value, maximum value, or average value of the time intervals at which the interrupt requests are generated.

The interrupt generation interval history storage circuit 304 stores the history of the values shown by the interrupt generation interval information S207 received from the interrupt generation interval measurement circuit 203, determines the minimum value, the maximum value, and the average value in the history, and stores them.

In response to the history information output request S304 received from the CPU 220, the interrupt generation interval history storage circuit 304 outputs the minimum value, the maximum value, or the average value of the values shown by the stored interrupt generation interval information S207 as history information S305 to the CPU 220.

By thus using the interrupt control circuit 200 according to the present embodiment, the interrupt control circuit 200 is allowed to store, a predetermined number of times, the interval at which the interrupt requests are generated and, at the time at which the interval of generation of the interrupt request becomes larger than one of the stored intervals, e.g., the maximum interval afterwards, the CPU is allowed to detect the change in the interval and perform proper error handling.

In addition, the CPU 220 is also allowed to acquire the information (the minimum value, the maximum value, or the average value) on the intervals of generation of the interrupt requests from the interrupt generation circuit 110 so that the acquired information is usable as information useful for the development of a program by a user or the like.

Embodiment 3

Figure 3:
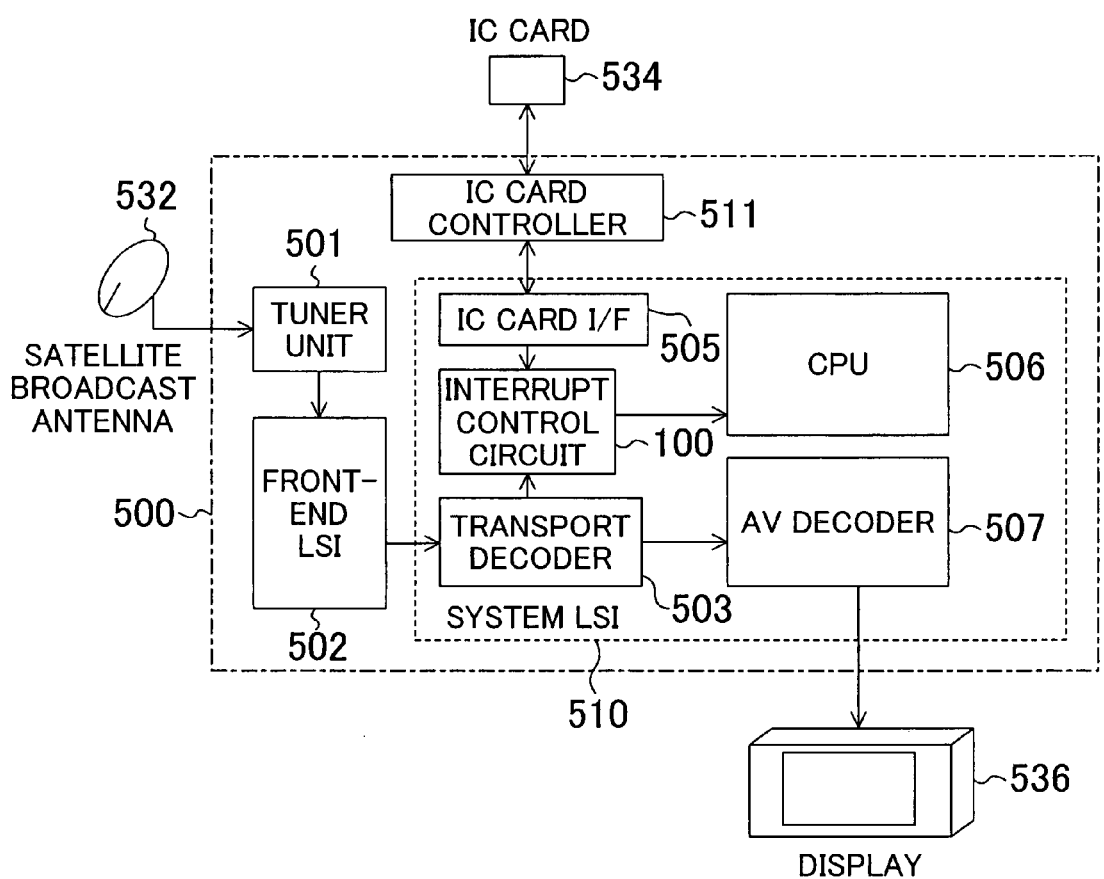
FIG. 3 is a block diagram showing a structure of a set-top box comprising a system LSI having the interrupt control circuit of FIG. 1.

FIG. 3 is a functional block diagram showing a structure of a set-top box 500 comprising a system LSI (large-scale integrated circuit) having the interrupt control circuit 100 of FIG. 1. The set-top box 500 of FIG. 3 comprises a tuner unit 501, a front-end LSI 502, a system LSI 510, and an IC (integrated circuit) card controller 511. The system LSI 510 comprises a transport decoder 503, the interrupt control circuit 100, an IC card interface 505, a CPU 506, and an AV (audio-visual) decoder 507.

The tuner unit 501 receives a broadcast wave from a satellite broadcast antenna 532. The front-end LSI 502 demodulates the broadcast wave and outputs an obtained transport stream to the transport decoder 503. The transport decoder 503 extracts necessary information from the transport stream and outputs an extracted AV packet to the AV decoder 507.

The interrupt control circuit 100 is the interrupt control circuit of FIG. 1, receives an interrupt request from each of the transport decoder 503 and the IC card interface 505, and notifies the CPU 506. The IC card interface 505 performs data transmission/reception between itself and an IC card 534 via the IC card controller 511. The CPU 506 controls each of the functional blocks of the system LSI 510. The AV decoder 507 decodes the AV packet and outputs an obtained motion picture and a sound to a display.

When satellite broadcasting is to be received, it is necessary for the system LSI 510 to decrypt the encrypted transport stream. A description will be given herein below to the operation of the system LSI 510 when satellite broadcasting is received by using the set-top box 500.

During the satellite broadcasting receiving operation, the transport decoder 503 performs the extraction of section data termed an encrypted ECM (entitlement control message) included in the transport stream once in two seconds and outputs an encrypted ECM extraction completion interrupt request to the interrupt control circuit 100. The interrupt control circuit 100 receives the encrypted ECM extraction completion interrupt request and notifies the CPU 506.

On receiving the encrypted ECM extraction completion interrupt request, the CPU 506 transmits the encrypted ECM to the IC card 534 via the IC card interface 505 and the IC card controller 511.

Then, the IC card interface 505 receives decrypted ECM data corresponding to the transmitted encrypted ECM from the IC card 534 via the IC card controller 511. Subsequently, the IC card interface 505 outputs a decrypted ECM data reception completion interrupt request to the interrupt control circuit 100.

On receiving the decrypted ECM data reception completion interrupt request, the CPU 506 sets the decrypted ECM to a register in the transport decoder 503.

The transport decoder 503 decrypts the encrypted transport stream by using the decrypted ECM received from the CPU 506 and outputs the AV packet to the AV decoder 507.

When the encrypted ECM extraction completion interrupt request, which should be generated once in two seconds, is not generated at that time interval, the interrupt control circuit 100 notifies the CPU 506 with the error detection interrupt signal.

In response to this, the CPU 506 promptly detects that the encrypted ECM extraction completion interrupt request is no more generated once in two seconds and performs proper error handling with respect to the system LSI 510 and to the other circuits.

Alternatively, the system LSI 510 may also comprise another functional block in addition to the transport decoder 503, the interrupt control circuit 100, the IC card interface 505, the CPU 506, and the AV decoder 507. It is also possible to construct a part of the system LSI 510 with another chip. When a new integration technology is developed, it may also be used.

As described above, the present invention allows error handling to be performed by detecting that the interrupt requests are not periodically generated without using a timer interrupt and is therefore useful for an information processing apparatus comprising a CPU such as a mobile phone, a digital television, or an on-vehicle terminal.

What is claimed is:

1. An interrupt control circuit comprising:
   a condition storage circuit for storing and outputting a reference time;
   an error detection circuit for outputting a signal indicating error detection when an interrupt request is not generated within a period from a predetermined time till the reference time elapses; and
   an interrupt generation interval measurement circuit for measuring and outputting time intervals at which the interrupt requests are generated, wherein the condition storage circuit selects one of the time intervals measured by the interrupt generation interval measurement circuit as the reference time, and the error detection circuit outputs the signal indicating error detection when an interval newly measured by the interrupt generation interval measurement circuit is larger than a value obtained by increasing the reference time at a predetermined ratio.

* * * * *